United States Patent
Panosh

(10) Patent No.: US 7,755,318 B1
(45) Date of Patent: Jul. 13, 2010

(54) SOFT-START/STOP SUMP PUMP CONTROLLER

(76) Inventor: Richard Panosh, 101 S. Canyon Dr., Bolingbrook, IL (US) 60490

(*) Notice: Subject to any disclaimer, the term of this patent is extended or adjusted under 35 U.S.C. 154(b) by 919 days.

(21) Appl. No.: 11/593,221

(22) Filed: Nov. 6, 2006

(51) Int. Cl.
*H02P 1/16* (2006.01)

(52) U.S. Cl. .......................... 318/778; 417/18; 417/36; 417/40

(58) Field of Classification Search ................ 318/778; 417/40, 36, 18
See application file for complete search history.

(56) References Cited

U.S. PATENT DOCUMENTS

| | | | |
|---|---|---|---|
| 3,951,568 A | 4/1976 | Carlson, Jr. | |
| 4,108,574 A | 8/1978 | Bartley | |
| 4,600,844 A * | 7/1986 | Atkins | 307/118 |
| 5,145,323 A * | 9/1992 | Farr | 417/36 |
| 5,234,319 A | 8/1993 | Wilder | |
| 5,238,369 A * | 8/1993 | Farr | 417/18 |
| 5,549,456 A | 8/1996 | Burrill | |
| 5,672,050 A * | 9/1997 | Webber et al. | 417/18 |
| 5,923,102 A * | 7/1999 | Koenig et al. | 307/118 |
| 6,481,973 B1 | 11/2002 | Struthers | |
| 6,676,382 B2 | 1/2004 | Leighton | |
| 7,183,741 B2 * | 2/2007 | Mehlhorn | 318/806 |
| 2005/0158177 A1 | 7/2005 | Mehlhorn | |

* cited by examiner

*Primary Examiner*—Bentsu Ro
*Assistant Examiner*—David S Luo

(57) ABSTRACT

A sump pump control includes a microprocessor that sends a trigger pulse to an alternistor to turn the alternistor on and connect the sump pump to an NC power source. The microprocessor also monitors the power source to find a positive/negative crossover point. The microprocessor adjusts the trigger to apply full power to the pump motor during normal operation and delays the trigger to apply reduced power for a soft start and soft stop. The microprocessor also triggers an alarm in the event of failure of the device, including failure of the alternistor or the microprocessor.

17 Claims, 3 Drawing Sheets

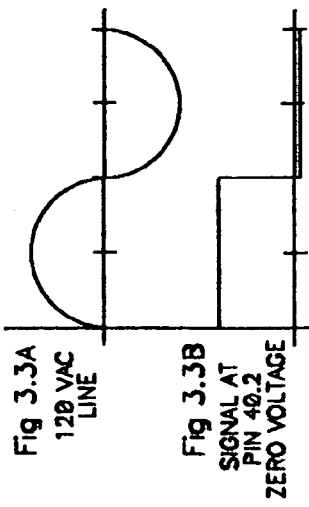
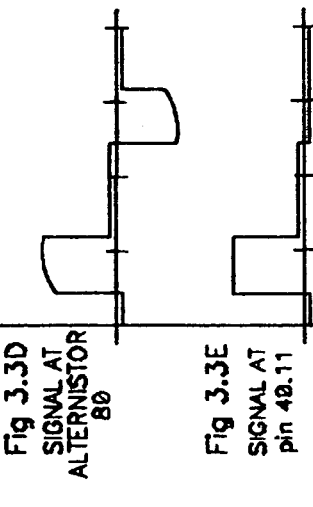
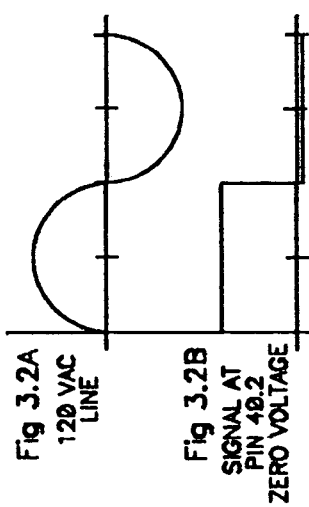
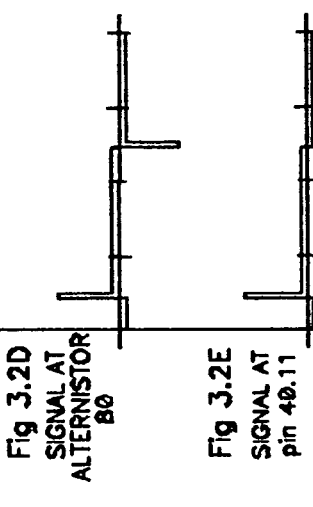
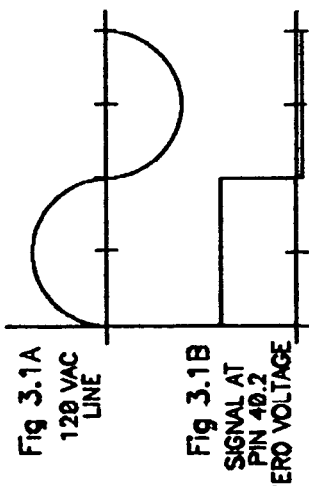
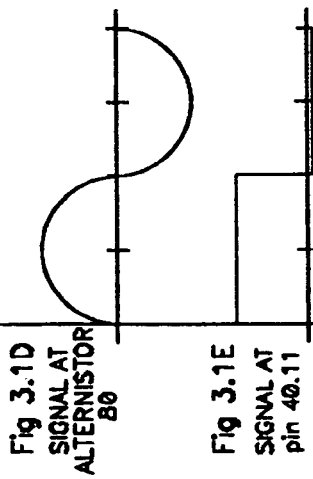

PUMP MOTOR "OFF" (ALTERNISTOR NON-CONDUCTING)

Fig 3.1A 120 VAC LINE
Fig 3.1B SIGNAL AT PIN 40.2 ZERO VOLTAGE
Fig 3.1C SIGNAL AT PIN 40.10 ALTERNISTOR TRIGGER
Fig 3.1D SIGNAL AT ALTERNISTOR 80
Fig 3.1E SIGNAL AT pin 40.11

PUMP MOTOR "ON" (ALTERNISTOR CONDUCTING)

Fig 3.2A 120 VAC LINE
Fig 3.2B SIGNAL AT PIN 40.2 ZERO VOLTAGE
Fig 3.2C SIGNAL AT PIN 40.10 ALTERNISTOR TRIGGER
Fig 3.2D SIGNAL AT ALTERNISTOR 80
Fig 3.2E SIGNAL AT pin 40.11

PUMP MOTOR HALF POWER (ALTERNISTOR DELAYED CONDUCTION)

Fig 3.3A 120 VAC LINE
Fig 3.3B SIGNAL AT PIN 40.2 ZERO VOLTAGE
Fig 3.3C SIGNAL AT PIN 40.10 ALTERNISTOR TRIGGER
Fig 3.3D SIGNAL AT ALTERNISTOR 80
Fig 3.3E SIGNAL AT pin 40.11

SOFT-START/STOP SUMP PUMP CONTROLLER

The present invention relates to a solid state control for a sump pump, and in particular to a control that provides a soft start, a soft stop, and a warning in the event of various forms of failure, including failure of the controller itself.

BACKGROUND OF THE INVENTION

Sump pumps are required in all present and new construction that is below grade level. The sump pump prevents the build up of water around the foundation. This prevents the water pressure from building up and cracking the foundation or leaking into the basement and causing water damage. To prevent this damage, perforated drain tile is placed around the basement footing which allows the water to seep into the tile and gravity feed to a sump pit. The sump pit contains a pump that is used to discharge the water away from the foundation. In some construction, an additional sump pump may be provided to pump water from a washing machine into the main sanitary sewer system. Generally, sump pump pits are from 15 to 18 inches in diameter and from 24 to 36 inches deep. Anything smaller could cause the pump to run too often or not be able to handle a large volume of water from a downpour.

There are two types of sump pump, the older pedestal pump and the newer submersible pump. The pedestal pump has the motor above the water in the pit and a long shaft extending down into the pit to pump the water. Submersible pumps are waterproof and placed directly in the pit to pump the water. Submersible pumps are more commonly employed today because they are more efficient and allow the pit to be completely enclosed. In addition, since the pump is below the water level, they are quieter.

Two items are required to complete the installation of a sump pump. A check valve (one way valve) is installed into the pump vertical discharge line to prevent pumped water from flowing back into the sump when the pump shuts off. The second item required is the water level switch that makes the operation automatic. Switches come in several types, including floats; diaphragm pressure switches and tethered tilt switches. Almost all of these switches employ mechanical means to control the large sump pump motor current and are subject to contact failure.

It has become common to finish basements so that the space is useable as living areas. The sump pump is needed to keep the basement living area dry, but the operating noises of the pump are objectionable. The check valve is the greatest cause of noise, especially where the pump is submersible. Every time the automatic switch turns the pump off, the water flow is interrupted and the reverse flow causes the valve to slam shut with a loud thud. The sudden shut off of the valve causes the discharge pipe to violently vibrate and rattle the wooden plate of the house where it passes through. The effect of the check valve is similar to the noise generated when a water valve in the house is suddenly closed off. To eliminate or reduce the effect of water hammering, expansion air volumes are installed on water valves that close suddenly, i.e. solenoid valves on the washing machine and dishwasher. A similar solution could be applied to the sump pump check valve; however, there is little headroom for an expansion air volume since the discharge pipe exits the house near the basement ceiling. There are a few precautions that can help to reduce the hammering. A check valve located at the base of the pump instead of above the floor level may help. When the valve is located next to the pump, the mass of the sump pumps can help reduce vibration and the surrounding water will also reduce the sound. The discharge pipe should not be fastened to the wooden plate where it exits the house. Instead, the discharge pipe should pass freely though a larger diameter pipe that is fastened to the wooden plate. The space between the two pipes can then be filled with foam insulation or fiberglass loosely packed to close the gap. This allows the discharge pipe some freedom to vibrate with out rattling the house.

SUMMARY OF THE INVENTION

The present invention is a device for controlling a sump pump motor so that it will produce less sound. The device includes a detector for remotely detecting the water level in the sump by means of the head height of liquid as measured as a pressure change by a solid state piezoresistive sensor. The analog pressure reading provides a continuous measurement of the water level in the sump and is digitized by an ND converter within the microprocessor. One level of the water triggers a switch to turn the sump pump "On" and another level triggers the switch to turn "Off." The specific levels are predetermined by jumpers on the microprocessor in the pump that permit the pump to operate in standard 24 inch or 36 inch depth sump pits. A third and higher alarm level is also provided to alert of pending overflow of the sump pit should the pump completely fail.

Control of the sump pump motor is by means of an alternistor. The alternistor is a solid-state switch similar to a triac but specifically designed to control inductive loads. The alternistor is triggered by the microprocessor each half cycle of the line voltage to provide both a soft-start and a soft-stop. The soft-start feature helps to reduce the inrush start up current, reduces stress on the motor bearings and especially reduces the start up impact stress upon the impeller blades that are usually made of plastic. The soft-stop feature allows the pressure in the discharge line to be gradually reduced until it equals the head height of water pressure in the discharge line and the flow just begins to reverse direction. At this point, the one-way check valve closes softly with reduced water hammering and subsequent pipe vibration.

The microprocessor, in addition to controlling the alternistor, also performs a number of diagnostic performance tests. It incorporates a WDT (Watch Dog Timer) that independently times the execution of the program loops to verify that the microprocessor is performing correctly. It monitors the water level within the sump pit and activates an alarm if the water level exceeds the normal high level at which the sump pump should activate. It also monitors the motor run time and activates an alarm if the motor runs continuously for more then ten minutes. This alarm might indicate that the pump is not turning, the impeller is broken, or the discharge line is blocked. Since the microprocessor controls the alternistor, it also monitors the line voltage zero crossing to time the trigger pulses during each half cycle and it also monitors the voltage across the alternistor. This voltage yields information about the condition of the alternistor. Specifically, this voltage will determine if the alternistor is open and unable to supply power to the motor or is shorted and constantly applying power to the motor. If the alternistor fails in an open condition, the microprocessor is programmed to initiate an alarm. However, the upper water level alarm will also signal a failure as the sump pit fills up with water. A more serious condition occurs if the alternistor fails in a shorted state, as the sump pump motor will continue to run. This condition will empty the sump pit and, without surrounding water, the motor will eventually overheat and possibly burn out. This condition is detected by monitoring the alternistor voltage and a continuous motor run time of ten minutes will also furnish an alarm condition.

The microprocessor is also programmed to monitor the power supply voltage. Should the power supply voltage fail or the AC power be lost, the microprocessor will also cause an alarm to sound. The alarm is powered by a nine-volt rectangular battery and will therefore function in the event of a failure of AC power. A momentary push button signals the microprocessor to deactivate the alarm. Once power returns, the microprocessor is programmed to return to normal operation and restore all monitor functions.

In addition to the audible alarm, an optically coupled and isolated contact closure is provided during an alarm condition. This contact can be used to trigger an additional remote alarm, activate an automatic telephone-dialing device or engage a secondary emergency pump system.

BRIEF DESCRIPTION OF THE DRAWINGS

A better understanding of the present invention will be had after a reading of the following detailed description taken in conjunction with the drawings wherein:

FIG. 3.1A depicts voltage against time for the 120 volt AC current from the power source P with the pump motor off;

FIG. 3.1B depicts voltage against time for the signal at pin 40.2 of the microprocessor 40 with the sump pump off;

FIG. 3.1C shows the trigger signal applied from pin 40.10 to the alternistor;

FIG. 3.1D shows the voltage across the alternistor 80 with the pump off;

FIG. 3.1E shows the voltage of the signal at pin 40.11 with the pump off;

FIG. 3.2A shows the AC voltage from P with the pump operating at full power;

FIG. 3.2B shows the voltage for the signal at pin 40.2;

FIG. 3.2C shows the trigger signal applied to operate the sump pump at full power;

FIG. 3.2D shows the voltage across the alternistor with the pump operating at full power;

FIG. 3.2E shows the voltage for the signal at pin 40.11 with the pump operating at full power;

FIG. 3.3A shows the AC voltage form P with the sump pump operating at about half-power;

FIG. 3.3B shows the voltage at pin 40.2;

FIG. 3.3C shows the trigger signal applied to operate the sump pump at about half-power;

FIG. 3.3D shows the voltage across the alternistor with the sump pump operating at half-power; and FIG. 3.3E shows the voltage for the signal at pin 40.11.

DETAILED DESCRIPTION OF PREFERRED EMBODIMENT

Figure 1:
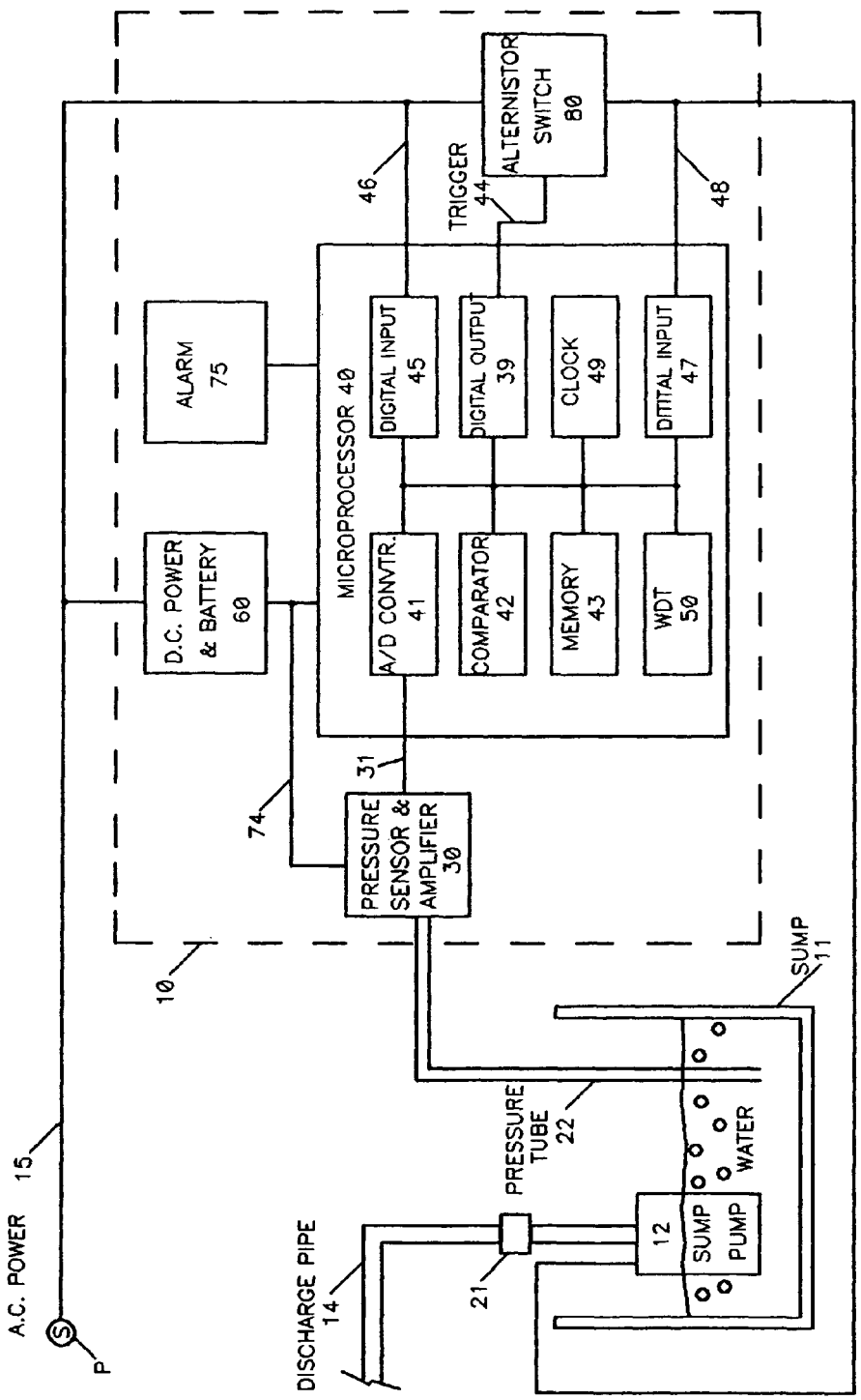
FIG. 1 is a block diagram of the systems of the sump pump controller.
Figure 2:
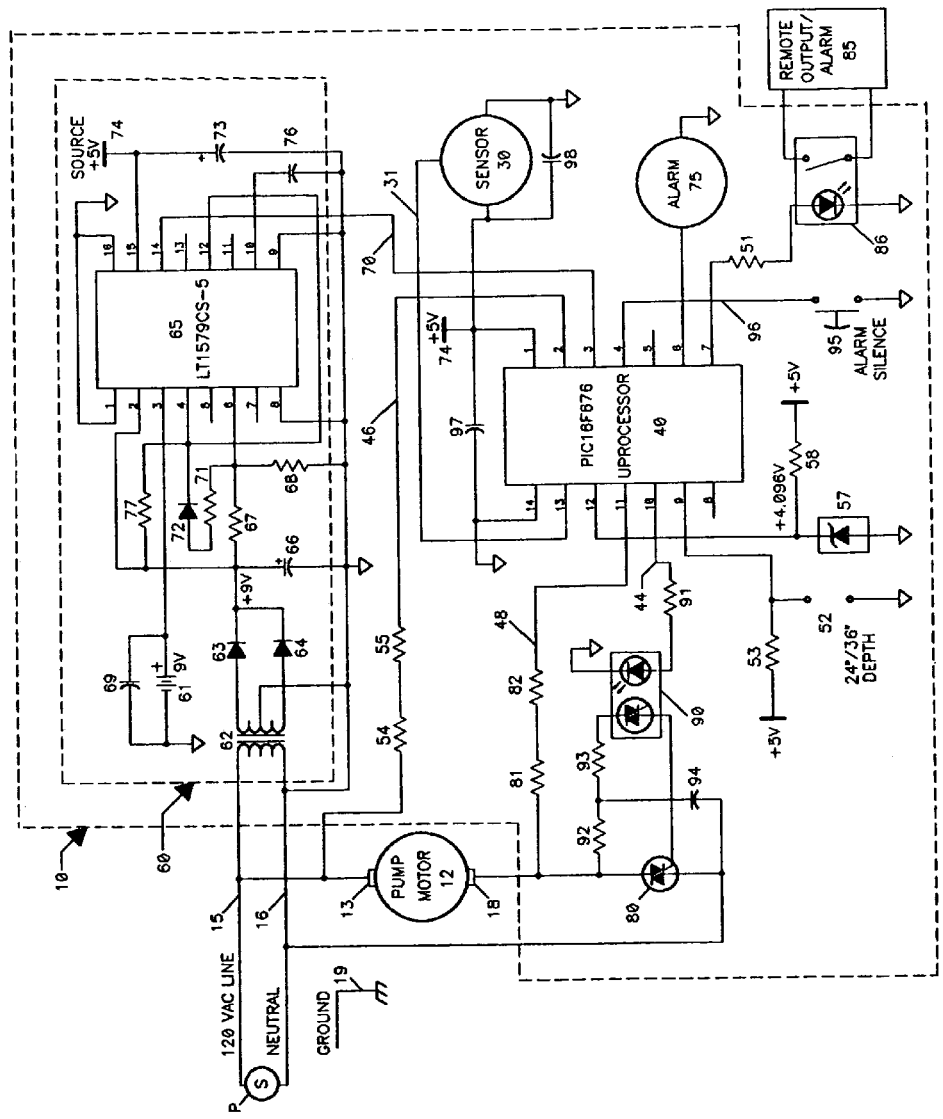
FIG. 2 is a detailed schematic diagram of the preferred embodiment of the sump pump controller.

Referring to FIGS. 1 and 2, a controller 10 is connected to a sump pump 12 having contacts 13, 18 positioned within a sump pit 11. The sump pump 12 may be a submersible pump as depicted, or an upright pedestal pump of the type commonly known in the art, and is connected to a discharge pipe 14 through which water is discharged from a basement. Positioned along the discharge pipe 14 is a one way check valve 21 that prevents water in the discharge pipe 14 from flowing backwards into the sump pit 11 after the sump pump 12 has been turned off. Contained within controller 10 is a piezoresistive gauge pressure sensor 30.

Extending into the sump pit 11 and below the level of the water 20 is one end of a pressure tube 22 the other end of which is connected to the piezoresistive gauge pressure sensor 30 in the controller 10. The piezoresistive gauge pressure sensor 30 measures the pressure within the tube 22 that is greater than one atmosphere of air pressure and produces an output 31 in the form of a voltage that is proportional to the water level above the open end of the pressure tube 22.

Electrically connected to the sump pump 12 is the device 10 which includes a power converter 60 that converts conventional one hundred twenty volt AC power of the type received from a conventional power source P through a power line 15, a neutral line 16, and having an associated ground line 19 to DC power 74 which is supplied to the gauge pressure sensor 30 and to a microprocessor 40 within the device 10. The microprocessor 40 receives the output 31 from the gauge pressure sensor 30 and within the microprocessor 40 is a A/D converter 41 that digitizes the output 31 from the gauge pressure sensor 30. Also within the microprocessor 40 is a comparator 42 and a memory 43 and the comparator 42 compares the water level in the sump 11, as determined by the output 31, to digitized values previously inserted in the memory 43 to determine when the sump pump 12 should be turned on or off. The memory 43 already retains a first digitized value that corresponds to a sensor output voltage 31 indicative of a high water level within the sump 11 for which power should be applied to the sump pump 12 for draining the sump 11, a second digitized value corresponding to a voltage 31 indicative of a low water level 22 within the sump 11 for which the power to the sump pump 12 should be terminated or turned off, and a third digitized value for the voltage 31 indicative of a water level 22 that exceeds the high water level and is indicative of failure of the sump pump 12. Upon detection by the microprocessor 40 of a voltage output 31 corresponding to the third digitized value, the microprocessor 40 will activate an alarm 75 to warn a home owner that the sump 11 is becoming overfilled and that flooding of a basement is eminent. The power converter 60 has associated therewith a backup battery 61 to provide power to the microprocessor 40 in the event of a failure of the AC power through power line 15. The microprocessor 40 may further sound the alarm 75 in the event of a loss of AC power.

The device 10 further includes an alternistor 80 connected in series with the power line 15 and the sump pump 12. The alternistor 80 turns on (conducts) in response to a trigger pulse 44 from the microprocessor 40 to apply power to the sump pump. To determine the timing for the trigger pulse 44 the microprocessor 40 includes a digital input 45 which monitors the AC power from the power line 15 through a power monitor line 46 for determining a zero voltage cross over time in the AC sine wave. The microprocessor 40 also includes a second digital input 47 that monitors the voltage across a line 48 connected to the alternistor 80 to monitor the voltage across the alternistor 80.

The microprocessor 40 also contains a clock 49 and a watch dog timer (WDT) 50 that monitors the execution time of the program loops. If the program loops within the microprocessor 40 are executed within the normal operating times, the WDT 50 is reset and no action is taken. If the program loops fail to be executed within the normal time frames, the WDT 50 times out and the microprocessor 40 will initiate the alarm 75 to signal that the microprocessor itself is experiencing a failure. The microprocessor also employs the clock 49 to monitor the time period for which the sump pump 12 is operating. If the microprocessor 40 determines that the sump pump 12 is operating for an inordinate length of time, for example—ten minutes, the microprocessor 40 will again sound the alarm 75 to indicate that the sump pump 12 is running continuously. This may occur in the event the impeller of the sump pump 12 fractures, the discharge pipe 14 fails, or for other failure of the sump pump 12.

Referring in further detail to the schematic diagram depicted in FIG. 2, the power converter 60 includes a transformer 62, in this case a XICON 41PG006 12.6 volt center tap transformer, to reduce the voltage from power line 15 to a useable level. The output from the transformer 62 is directed through a pair of rectifier diodes 63, 64 and the raw DC power which is filtered by a capacitor 66. The DC voltage is applied to terminal 2 (referred to herein as pin 65.2) of a battery backup regulator IC bearing indicia number 65, in this case a LT1579-5 Dual Input Smart Battery Backup Regulator manufactured by Linear Technologies, which is designed to provide an uninterrupted regulated 5 volt output 74 from two independent input sources. In this case the input sources are the transformer 62 and the backup nine-volt battery 61. Resistors 67, 68 are 2.7 megohm and 1 megohm respectively and form a voltage divider that scales down the primary voltage that is applied to pin 6 of the IC 65 (referred to here as pin 65.6) to a value that is lower than the voltage applied to pin 65.2. Pin 65.6 feeds into an internal voltage comparator that compares the voltage at pin 65.6 to an internal 1.5-volt band gap reference. So long as the supply voltage to pin 65.2 of IC 65 exceeds 5.5 volts, the voltage at pin 65.6 will be above 1.5 volts and the IC 65 will supply power through output pin 15 to the microprocessor 40 from the transformer 62. If the main power supply voltage drops below 5.5 volts, the internal voltage comparator switches to the battery backup power supply that is received through pin 65.3 of IC 65 and thereafter the battery 61 provides power to the microprocessor 40 through the output pin 65.15. When the internal comparator causes the IC 65 to switch to the backup battery 61, the IC 65 sends a warning signal through pin 65.14 thereof through a wire 70 connected to pin 40.3 of microprocessor 40, and the microprocessor 40 in turn triggers the alarm 75 to warn the homeowner that the primary power to the device 10 has failed. The voltage applied by the battery 61 to IC pin 65.3 is also measured by an internal comparator within the IC 65 and a separate output, not depicted, from the ICU 65 can also be directed to the microprocessor 40 for initiating the alarm 75 in the event the replacement of the battery 61 is required. Pin 65.12, which is the output from the voltage comparator is connected to pin 65.4, the secondary select pin that forces the IC 65 to switch from the transformer 62 to the battery 61. Resistor 71 and diode 72 are positioned in series between pins 65.6 and 65.4 and provide directional feedback around the internal comparator to increase hysteresis by 200 my to prevent chattering near the switch over point between the transformer 62 and the backup battery 61. Another capacitor 73 serves as a filter for the output power 74 of five volts applied to the microprocessor 40 and to the gauge pressure sensor 30. Another capacitor 76 connected between terminal 65.10 and the neutral line 16 provides bias compensation to the internal chip power.

The microprocessor 40 is preferably a PIC16F676 manufactured by Microchip Corporation and it contains several crucial elements such as a POR (low power, power on reset), a PWRT (power-up timer), a OST (oscillator startup timer), and a BOD (brown out detector). These features are useful during the microprocessor power-up or loss of power, to guarantee that the power supply is stable before the microprocessor 40 begins executing a program. The microprocessor 40 also includes a internal four MHz oscillator with a factory calibration of ±2 percent that allows program execution and timing to one microsecond, thereby eliminating the need for an external crystal/ceramic resonator. The microprocessor further contains a 10 bit AD converter 41 suitable to digitize the input from the pressure sensor 30 to one part in one thousand.

The gauge pressure sensor 30 is preferably manufactured by Free Scale Semi-Conductor, Inc. and sold as product no. MX5010GP. This is an integrated sensor with on-chip signal conditioning, temperature compensation and factory calibration. The response is to a full scale pressure of 1.45 psi but can withstand an over pressure of ±one atmosphere (14.7 psi). Sensitivity is approximately ninety-two mV per inch of water. For a standard sump pump pit 11 of twenty-four inch depth, the maximum voltage output would be 2.2 volts and for a thirty-six inch depth the maximum output voltage would be 3.3 volts. The output of the gauge pressure sensor 30 is directed through line 31 to pin 40.13 of microprocessor 40. Pin 40.13 is configured as an analog input to the A/D converter 41. An LN4040-4.1 bearing indicia number 57 and manufactured by National Semiconductor, Inc. is connected to pin 40.12 and provides a precision voltage reference of 4.096 volts ±0.1 percent to the 10 bit A/D converter 41. The microprocessor 40 compares the water depth value from the internal A/D converter 41 to the first, second, and third pre-established values in the memory for turning the sump pump on or off or initiating the alarm 75. A jumper line 52 is connected to pin 50.9 through a pull-up resistor 53. With the jumper 52 installed, the microprocessor 40 looks for an output voltage of somewhat less than 3.3 volts which corresponds to a thirty-six inch depth sump pit and with the jumper 52 removed, the microprocessor 40 looks for an output voltage through 31 of somewhat less than 2.2 volts, corresponding to a twenty-four inch depth sump pit 11.

The alarm 75 is preferably a PK-20A25P manufactured by Mallory (Cornell Dubilier) that produces a 2.5 kHz audio-alarm at about ninety-five dB with a power consumption of 1.5 mA at five volts. The signal produced by the alarm 75 can be programmed to be a predetermined number of beeps in quick succession and then a pause. In this fashion, the specific reason for triggering the alarm 75 can be made known and thereby assist in the diagnosis of the underlying problem. The alarm 75 is initiated by a signal from pin 40.6 of microprocessor 40. Another signal may be directed from pin 40.7 to an electrically isolated device 85 such as a backup sump pump or a remote alarm through an optically coupled relay 86, which in the preferred embodiment is a PS7241-1A solid state relay manufactured by California Eastern Laboratories. Alternately, the output from terminal 40.7 may be used to activate an automatic telephone dialer or turn on an auxiliary backup sump pump system, not shown.

The battery 61 is preferably a nine volt carbon zinc battery which can operate the microprocessor 40 and the alarm 75 for many hours and will provide backup power to the device 10 without complicated charging circuits. An alarm silencing switch 95 connected by a line 96 to terminal 40.4 connects terminal 40.4 to ground for terminating a signal to the alarm 75. After silencing the alarm 75, the microprocessor 40 will reactive all normal alarm modes when the initial cause of the alarm has been removed. Power is applied to microprocessor 40 through pin 40.1 which is connected to the five volt power source 74. Pin 40.2 is connected though a pair of 3 megohm resistors 54, 55 by line 46 to the AC power line 15 for determining the time of a cross over voltage in the power line 15. The resistors 54, 55 and internal diodes within the microprocessor 40 limit the voltage at pin 40.2 to a digital voltage level between +5V volts and −650 millivolts (true or false). A change of the state of the voltage at pin 40.2 causes an interrupt that flags a zero crossing time.

In similar fashion, resistors 81 and 82 are connected in series by line 48 between the high side of the alternistor 80 and pin 40.11 such that the microprocessor 40 can monitor the voltage across the alternistor 80. Preferably, the alternistor is a Q4015L6 manufactured by Teccor Electronics, Inc. The alternistor 80 performs similar to a triac but is specifically designed to operate with inductive loads such as encountered with the coils of an electric motor. The Q4015LC alternistor is rated at 15 amperes with a peak blocking voltage of 400 volts. The alternistor 80 is driven into conduction by means of an optical coupler 90 which contains a convention triac optically coupled to an LED. This is preferably a MOC3022M manufactured by Motorola, Inc. The LED of the optical coupler 90 is driven by ten mA of current through a resistor 91 through line 44 connected to pin 40.10 of microprocessor 40. The internal triac (unnumbered) of the optical coupler 90 is connected to the alternistor 80 in a conventional manner utilizing current limiting resistors 92, 93 and a capacitor 94 in a "T" arrangement connected to pin 40.10 of the microprocessor 40. A pulse on line 44 (shown in FIG. 2) from the microprocessor 40 on pin 40.10 and resistor 91 to the LED of optical coupler 90 thereby triggers the alternistor 80.

A list of the parts depicted in FIG. 2 is as follows:

| | |
|---|---|
| 10 | control device |
| 12 | sump pump motor |
| 13 | contact for sump pump motor |
| 15 | AC power line |
| 16 | AC neutral line |
| 18 | second contact for sump pump motor and to alternistor |
| 19 | ground contact |
| 30 | piezoresistive pressure gauge no. MX5010GP made by Freescale Semiconductor, Inc. |
| 31 | connecting wire |
| 40 | microprocessor PIC16F676 |
| 44 | connecting wire |
| 46 | connecting wire |
| 48 | connecting wire |
| 52 | jumper |
| 53 | 220K ohm resistor |
| 54 | 3 M ohm resistor |
| 55 | 3 M ohm resistor |
| 57 | LM4040-4.1 made by National Semiconductor, Inc. |
| 58 | 900 ohm resistor |
| 61 | 9 volt battery |
| 62 | X1CON 41PG006 12.5 V center top transformer |
| 63 | 1N4004 diode |
| 64 | 1N 4004 diode |
| 65 | LT 1579-5 Dual Input Smart Battery Backup Regulator made by Linear Technologies |
| 67 | 2.7 M ohm resistor |
| 68 | 1 M ohm resistor |
| 69 | 0.01 uFd capacitor |
| 70 | connecting wire |
| 71 | 10 M ohm resistor |
| 72 | 1N 4148 diode |
| 73 | 100 uFd capacitor |
| 74 | 5 volt power source |
| 75 | PK-20A25P piezoelectric alarm made by Mallory (Cornell Dubilier) |
| 76 | 0.01 uFd capacitor |
| 77 | 1 M ohm resistor |
| 80 | Q4015LG alternistor made by Tecor Electronics, Inc. |
| 81 | 3 M ohm resistor |
| 82 | 3 M ohm resistor |
| 85 | Remote device such as backup pump or alarm |
| 86 | PX72 41-1A solid state relay made by California Eastern Laboratories |
| 90 | MOC3022M triac opto-coupler made by Motorola, Inc. |
| 91 | 330 ohm resistor |
| 92 | 100 ohm resistor |
| 93 | 100 ohm resistor |
| 94 | 0.1 uFd capacitor |
| 95 | contact switch |
| 96 | connecting wire |
| 97 | 0.1 uFd capacitor |

Referring to FIGS. 3.1A to 3.3E in which graphs of the electric signal in various lines are depicted against time. FIGS. 3.1A to 3.1E depict the signals at certain points when the pump motor 12 is off and the alternistor 80 is nonconducting, FIGS. 3.2A to 3.2E depict the signals when the pump motor 12 is running and the alternistor 80 is conducting, and FIGS. 3.3A to 3.3E depict the signal when the pump motor 12 is operating at about one-half power which occurs when the trigger signal to the alternistor 80 has been delayed. Specifically, FIG. 3.1A depicts the 120 volt AC current with the X axis representing time (16.7 msec for one complete cycle of 60 Hz) and the Y axis is the amplitude of the signal. No scale is provided for the Y axis, however the AC line peak voltage is ±170 volts.

FIG. 3.1B is the signal found at pin 40.2 of the microprocessor 40 and is used to detect the timing of the crossover voltage. The high voltage depicted in FIG. 3.1B is +5 volts and the minimum is −650 millivolts.

FIG. 3.1C depicts the trigger signal applied from pin 40.10 to the alternistor 80. Since the pump motor 12 is Off, no trigger signal is sent to the alternistor 80.

FIG. 3.1D depicts the voltage at the contact 18 of the motor 12 when the alternistor 80 is not conducting. With the motor off, this is the same as the voltage applied to contact 13. FIG. 3.1E depicts the signal detected at pin 40.11 of the microprocessor 40 by which the microprocessor 40 monitors the output of the alternistor 80 through line 48.

FIG. 3.2A again depicts the voltage of the 120 AC line 15 while the sump pump is operating at full power and FIGS. 3.2B to 3.2E show voltages measurements with the pump operating at full power. FIG. 3.2B depicts the voltage crossover point at pin 40.2 of the microprocessor and FIG. 3.2C depicts the voltage of the signal issued from pin 40.10 of the microprocessor 40. The alternistor 80 turns off as soon as the current through it and the pump motor 12 drop to zero, which is at the current cross over point. The current cross over point lags behind the voltage cross over point by a few milliseconds and is more difficult to measure than the voltage cross over point, but the delay is readily calculated for a given motor. In order for the pump to continue operating at full power the trigger pulse 44 is delayed from the voltage cross over point just long enough for it to follow immediately behind the current cross over point, thereby retriggering the alternistor as soon as current can again flow, and thereby maintaining full current to the sump pump motor 12. The current zero crossing is found in FIG. 3.2E at the instant that voltage spikes positive, because this is the instant that the alternistor has turned off. The voltage drops to a nominal level an instant later because the alternistor 80 has been retriggers by pulse 44 and is again conducting. FIG. 3.2D depicts the voltage at contact 13 of the pump motor 12 and FIG. 3.2E depicts the voltage at pin 40.11 of the microprocessor 40.

FIGS. 3.3A to 3.3E show voltage reading for the sump pump motor running at about one half power. FIG. 3.3A again depicts the AC power while the sump pump is running at about one-half power, and FIG. 3.3B depicts the voltage at pin 40.2 used to determine a voltage cross over time. FIG. 3.3C depicts the timing of the trigger pulse sent from pin 40.10. As can be seen, the trigger pulse is delayed after the current cross over point until near the peak voltage so that the motor current is reduced to an average power of about fifty percent. FIG. 3.3D depicts the voltage at contact 18 of the motor 12 and FIG. 3.3E depicts the signal detected at pin 40.11 of the microprocessor 40.

Where the microprocessor 40 has been programmed to initiate reduced power to the sump pump 12 for either a soft start or a soft stop, the alternistor 80 will receive a trigger pulse at pin 40.10 that is further delayed from the crossover point and near the peak voltage, positive or negative. For a soft startup, a reduced voltage should be applied to the sump pump 12 over a period of perhaps one second. A soft startup will reduce the rush of current that flows through the windings in the motor at startup and thereby reduce the heat produced in the windings. A soft start will also reduce the stress on the sump pump impeller, which may be made of plastic and subject to fracturing. It will also reduce the stress on the motor bearings such that the useful life of the sump pump is maximized. When the power applied to the motor is reduced gradually to form a soft stop, the power is preferably ramped downward over a longer period of time, perhaps six seconds. The soft stop will reduce the effects of water hammering by gradually slowing the movement of water in the discharge pipe 14.

From the input shown in FIGS. 3.1E, 3.2E, and 3.3E received at contact 40.11 of the microprocessor 40, the microprocessor is able to monitor the performance of the alternistor 80 by comparing the logic levels at pin 40.11 with the expected logic levels stored in the memory 43 for the alternistor 80 when the alternistor is operating properly. In general, when the alternistor 80 is non-conducting (sump pump motor 12 off), the signal at pin 40.11 is logic high during the positive half-cycle of the voltage sine wave P. When the alternistor 80 is conducting (sump pump motor 12 running), the signal at pin 40.11 following the trigger pulse 44 is logic zero during the positive half-cycle of the sine wave voltage P. From these conditions the microprocessor 40 can determine that the alternistor 80 is conducting when it should be conducting and not conducting when it should not be conducting. The microprocessor 40 can therefore determine whether the alternistor 80 is shorted or burnt out and failed. The signal directed to pin 40.11 also enables the microprocessor to determine whether the sump pump motor 12 is running continuously, which would be indicative of failure of the impeller, or of the discharge line. The microprocessor 40 is programmed to initiate the alarm 75 in the event of a failure of the alternistor 80 or of the sump pump 12.

As previously stated, the microprocessor 40 will also energize the alarms 75 to provide a warning in the event the sump pit 11 is on the verge of overflowing and to sound an alarm 75 in the event of an AC power line failure. A warning may also be initiated in the event of a microprocessor 40 failure as determined by an internal evaluation of the microprocessor 40. The microprocessor 40 can be programmed to sound a different combination of beeps and pauses for each type of failure such that a homeowner can determine the cause of the alarm from the combination of sounds being emitted.

While the present invention has been described with respect to a single embodiment, it will be appreciated that many modifications and variations may be made without departing from the spirit and scope of the invention. It is therefore the intent of the following claims to cover all such variations and modifications that fall within the spirit and scope of the invention.

What is claimed is:

1. A controller for controlling the application of electric power from an AC power source to a sump pump comprising
an alternistor controlling power to said sump pump, and
a microprocessor controlling said alternistor,
said microprocessor including a clock,
said microprocessor monitoring said source of AC power to find a zero voltage indicator of a cross over in an AC sine wave,
said microprocessor using said voltage cross over to determine a timing of a current cross over,
said microprocessor sending a trigger pulse to said alternistor to switch said alternistor to a conducting state,
said microprocessor delaying said trigger pulse after said current cross over until a time near a peak voltage of said sine wave to apply reduced power to said sump pump,
said microprocessor sending said trigger pulse to said alternistor immediately after said current cross over to apply full power to said sump pump, and said reduced power applied to said sump pump for an interval of time at a startup of said sump pump to provide a soft start.

2. The controller of claim 1 wherein reduced power is applied over a period of about one second at said startup.

3. The controller of claim 1 and further comprising delaying said trigger pulse after said current cross over to near a peak voltage to apply a reduced power to said sump pump for an interval of time prior to turning off said sump pump.

4. The controller of claim 3 wherein reduced power is applied over a period of about five seconds immediately prior to said turn off of said sump pump.

5. The controller of claim 1 and further comprising
a connecting wire between a contact of said alternistor and said microprocessor wherein said microprocessor can monitor a voltage across said alternistor, and
said microprocessor issuing a warning signal upon the failure of said alternistor.

6. The controller of claim 5 wherein said microprocessor includes
a memory,
a comparator, and
a programmed logic sequence wherein said programmed logic sequence compares logic levels for voltages measured across said alternistor with logic levels stored in said memory, and
said microprocessor issues said warning signal when said logic levels fall out side said levels stored in said memory.

7. The controller of claim 6 wherein said memory also contains logic levels corresponding to a voltage across said alternistor for said sump pump off and for said sump pump running.

8. The controller of claim 1 wherein said crossover time is used to calculate the time of a peak voltage and for issuing said a-trigger pulse near said peak voltage for applying reduced power to said sump pump.

9. A controller for controlling the application of electric power from an AC power source to a sump pump comprising
an alternistor controlling power to said sump pump,
a microprocessor controlling said alternistor,
said microprocessor including a clock,
said microprocessor monitoring said source of AC power to find a zero voltage indicator of a cross over in an AC sine wave,
said microprocessor using said voltage cross over to determine a timing of a current cross over,
said microprocessor sending a trigger pulse to said alternistor to switch said alternistor to a conducting state,
said microprocessor sending said trigger pulse to said alternistor immediately after a said current cross over to apply full power to said sump pump, said microprocessor delaying said trigger pulse after said current cross over until a time near a peak voltage of said sine wave to apply reduced power to said sump pump, and said microprocessor applying reduced power to said sump pump for an interval of time immediately prior to said turn off of said sump pump to provide a soft stop.

10. The controller of claim 9 wherein reduced power is applied over a period of about five seconds immediately prior to said turn off of said sump pump.

11. The controller of claim 9 wherein said alternistor also applies reduced power to said sump pump for an interval of time at the startup of said sump pump.

12. The controller of claim 11 wherein reduced power is applied over a period of about one second at said startup.

13. The controller of claim 9 and further comprising said controller delaying said trigger pulse after said current cross over to near a peak voltage of said sine curve to apply reduced power to said sump pump for an interval of time at startup to provide a soft startup.

14. The controller of claim 9 and further comprising a connecting wire between a contact of said alternistor and said microprocessor wherein said microprocessor can monitor a voltage across said alternistor, and said microprocessor issuing a warning signal upon the failure of said alternistor.

15. The controller of claim 14 wherein said microprocessor includes a memory, a comparator, and a programmed logic sequence wherein said programmed logic sequence compares logic levels for voltages measured across said alternistor with logic levels stored in said memory, and said microprocessor issues said warning signal when said logic levels fall out side said levels stored in said memory.

16. The controller of claim 15 wherein said memory also contains logic levels corresponding to a voltage across said alternistor for said sump pump off and for said sump pump running.

17. The controller of claim 9 wherein said crossover time is used to calculate the time of a peak voltage and for issuing a trigger pulse near said peak voltage for applying reduced power to said sump pump.

* * * * *